Nov. 6, 1962  B. D. LEE  3,063,034
METHOD AND APPARATUS FOR DATA PROCESSING
Filed Oct. 20, 1958  3 Sheets-Sheet 2
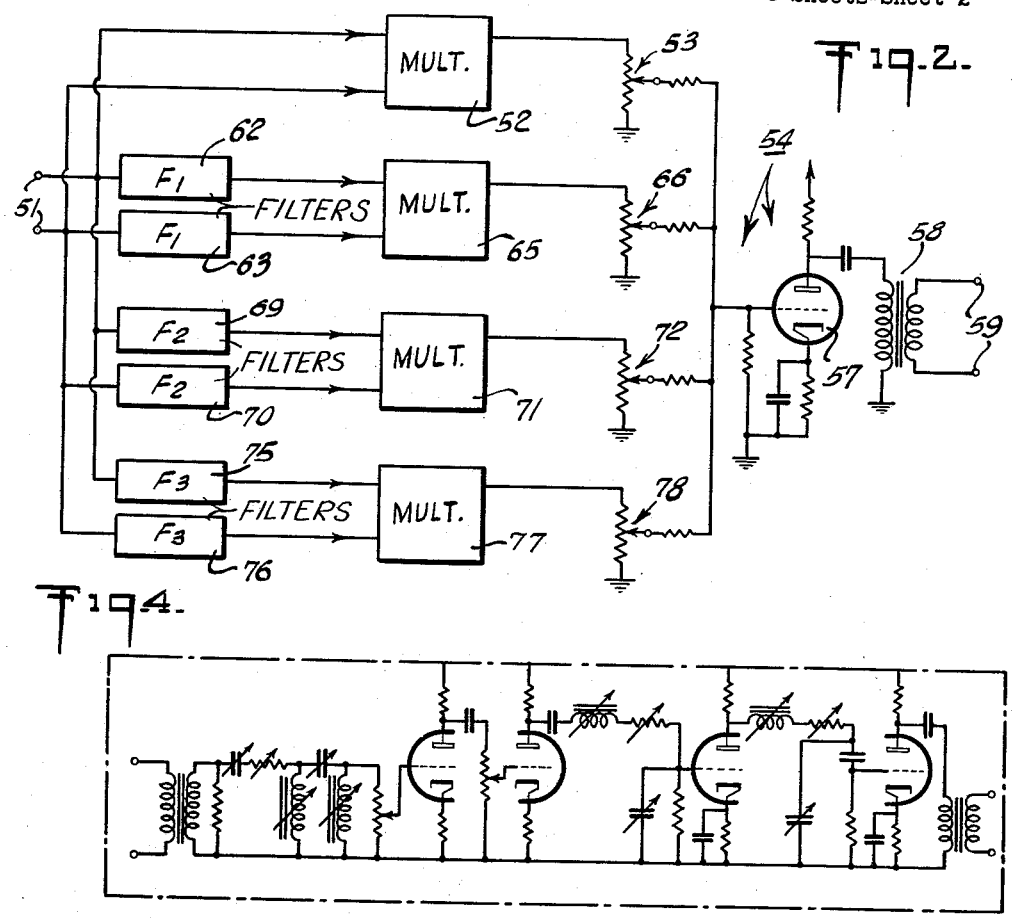
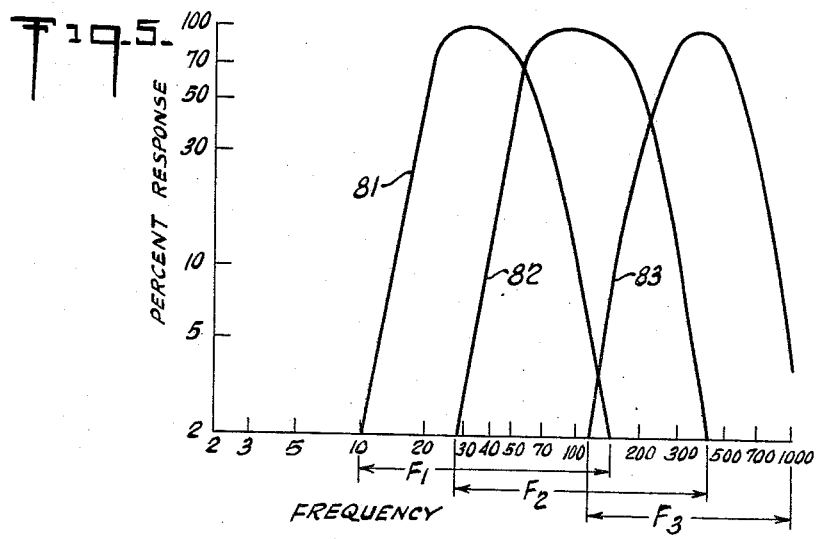

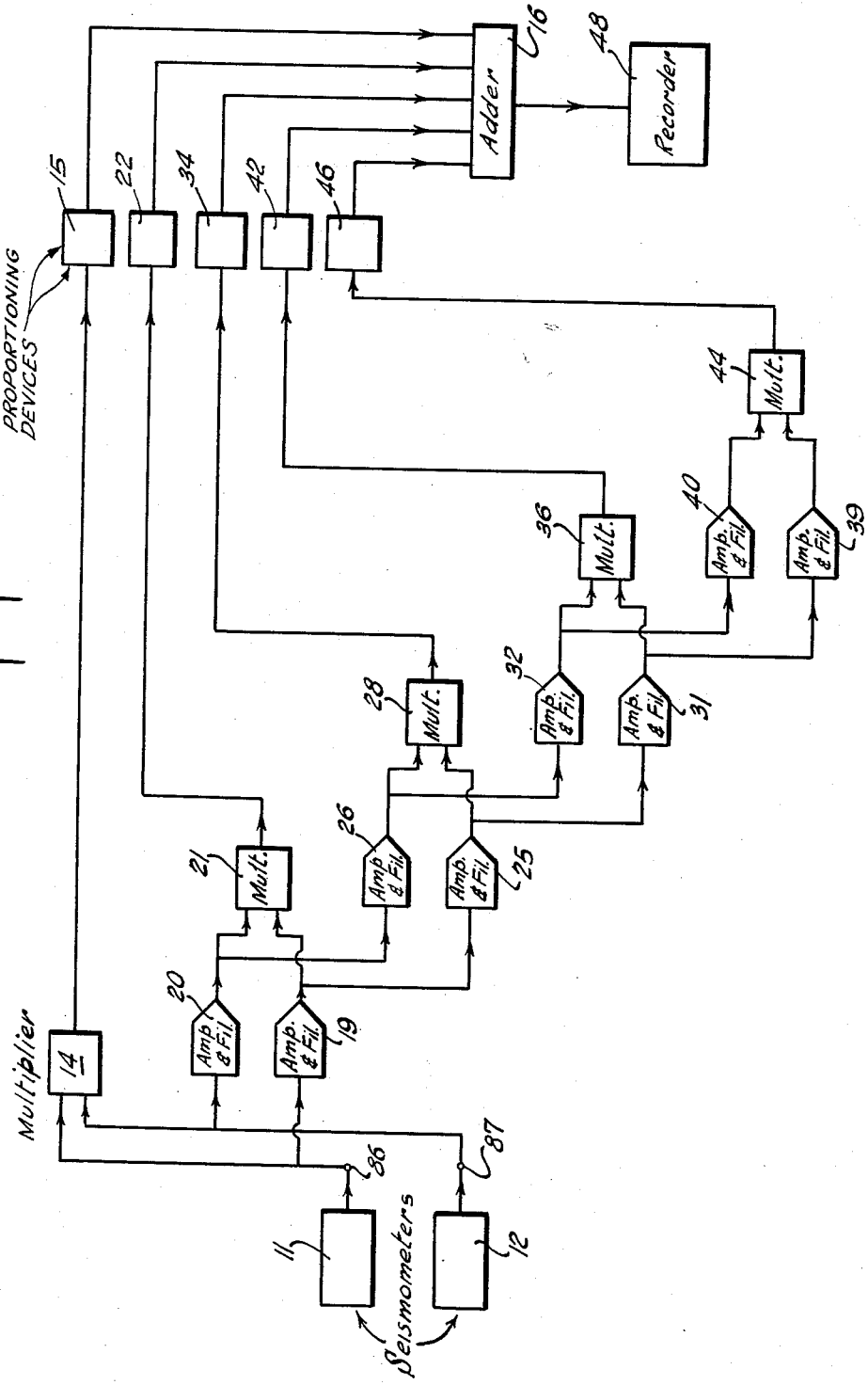

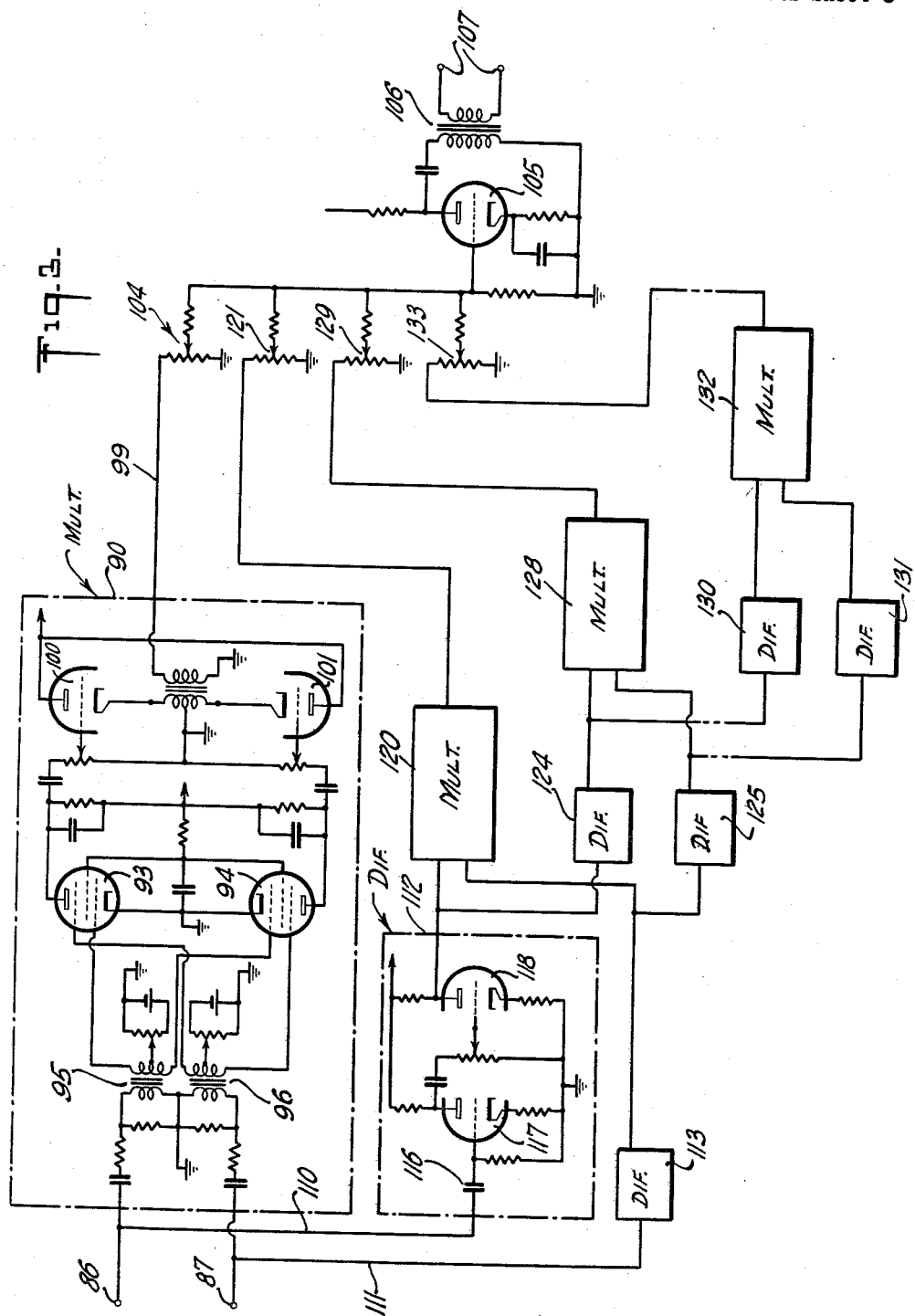

United States Patent Office 3,063,034
Patented Nov. 6, 1962

3,063,034
METHOD AND APPARATUS FOR
DATA PROCESSING
Burton D. Lee, Houston, Tex., assignor to Texaco Inc.,
a corporation of Delaware
Filed Oct. 20, 1958, Ser. No. 768,387
9 Claims. (Cl. 340—15.5)

This invention is concerned with a data processing method and apparatus. More specifically, it is concerned with a special data processing system and/or method for use in seismic exploration.

In seismic exploration work, in general, the problems involved are most often of a nature that is concerned with the obtaining from signals (generated by seismometers at the surface of the earth) the data that is contained therein which is valuable. Particularly in reflection seismic work, such data is largely apparent only by a correlation of the data from one trace to another across an oscillographic record of the data that is obtained from the seismometers. There are many areas where the signals generated by the seismometers contain desired data, but such data is masked by extraneous signals that are equal to or greater in amplitude than that of the desired signals. This problem has been attacked in many ways, including among others the use of a multiplier circuit arrangement for multiplying together the signals from a pair of seismometer inputs, in order to tend to suppress the non-correlative data that exists in the two signals while increasing or building up the correlative data in the signals. Such a multiplier is described and claimed in my copending application Serial No. 393,433, filed November 20, 1953. However, a drawback of such a multiplier was the inability to bring out the desired data in the form of a reflection, when such reflection was masked under certain conditions, e.g. by a low frequency signal such as ground roll or the like. For instance, in the situation where a reflection was superposed on a low frequency ground roll signal during the negative swing of the low frequency signal, the nature of the multiplier circuit was such that it discarded the negative products involved. Therefore, the reflection that was thus masked by superposition on a negative swing of non-correlative data, was discarded along with all negative product data.

By making use of this invention, however, the data that was not uncovered by the use of former techniques, may be brought out by employing additional steps in conjunction with the multiplying of signals that are suspected of having correlative data. These additional steps include, among others, the filtering of these signals in order to derive components therefrom, and then the multiplying of the components thus obtained. Also included are the proportioning and adding together of the product obtained from the multiplication of the original two signals, in addition to the product of the multiplication of the filtered signals.

Thus, it is an object of this invention to provide a method and system for emphasizing correlative information in a pair of signals, by multiplying these signals together and in addition by filtering these signals to obtain or derive a certain component thereof. Also by multiplying the components of the two signals together, followed by the proportioning and adding of the products of the two multiplications. The whole arrangement being in order to tend to reduce the non-correlative data that exists in the two signals involved, while emphasizing the correlative data which contains the desired information.

Another object of the invention is to provide a method and apparatus for processing seismic data so as to bring out reflection signals, that exist but that are masked by non-correlative signal information existing in the output signals from a pair of seismometers or seismometer groups.

Briefly, the invention concerns data processing, and a method of emphasizing correlative information in a pair of signals. The method that is thus employed comprises multiplying said signals together to provide a first output; and filtering each of said signals to derive components therefrom, as well as multiplying said filtered components together to provide a second output. The method also comprises proportioning said first and second outputs, and adding said proportioned outputs to provide a final output signal with non-correlative data in said pair being suppressed in favor of correlative data.

Also, the invention may be briefly described as a system that is for use in seismic signal data processing. Such system is one that includes means for reducing the amplitude of non-correlative data from a pair of seismometer inputs, wherein said seismometers are so located relative to one another that the signals generated thereby should be correlatable if reflected energy is being received by the seismometers. The system comprises means for multiplying said seismometer signals together to provide a first output signal, and means for filtering each of said seismometer signals to derive components therefrom. The system also comprises means for multiplying said filtered components together to provide a second output signal, and means for proportioning said first and second output signals, in addition to means for adding said proportioned output signals together to provide a final output signal. Finally, the system comprises means for utilizing said final output signal to determine seismic information.

The foregoing and other objects and benefits of the invention, will be more fully set forth below in connection with detailed descriptions of preferred embodiments. These are illustrated in the drawings in which:

FIG. 1 is a schematic, block diagram indicating a preferred embodiment of a system for carrying out the invention;

FIG. 2 is a schematic diagram, partially in block form, indicating a different embodiment of the invention;

FIG. 3 is a schematic circuit diagram, illustrating a preferred circuit for the elements that are included in the FIG. 1 system;

FIG. 4 is a schematic circuit diagram, illustrating one of the filter elements of the FIG. 2 embodiments; and FIG. 5 is a graph illustrating the frequency plotted against the percent response of the three different filters being employed in the FIG. 2 system.

Referring to FIG. 1, it is to be observed that there is illustrated a pair of seismometers 11 and 12. These two seismometers may be any pair of seismometers that are employed in a seismic spread wherein seismic signals are generated; so long as the pair chosen are situated in the spread in such a way that the data provided by the signals therefrom is correlatable. By way of example of the locations for such a correlatable pair of seismometers, adjacent seismometers (or seismometer groups) may be chosen as the pair of seismometers illustrated. Or, the seismometer pair (11, 12 illustrated) may be the corresponding seismometers (or seismometer groups) on opposite sides of the shot point in a split spread arrangement.

The signals from the seismometers 11 and 12 are fed into a multiplier 14 as the two inputs thereof. The output of multiplier 14 is fed to a proportioning device 15 and from there to one of the inputs of a summation circuit, or adder 16.

The signals from seismometers 11 and 12 are also fed into a pair of amplifier-and-filter elements 19 and 20 respectively. The outputs of these elements 19 and 20 are fed into another multiplier 21, and the output (or product signals) of multiplier 21 is fed to another proportioning device 22. From proportioning device 22, some proportioned part of the product of multiplier 21 is fed into another one of the inputs of the adder 16.

The filter of each of the amplifier-and-filter elements 19 and 20 may take various forms. However, in the preferred example illustrated in FIG. 3, the filter is a derivative circuit for obtaining the first derivative with respect to time of the seismometer signals. Thus the first derivatives of the two signals are multiplied, and then they are added to the product of the signals themselves, which were multiplied at multiplier 14 and sent to the adder. The proportioning devices 15 and 22 determine that proportion of the product signals from multipliers 14 and 21 that are to be added in the adder 16.

The signals from amplifier-and-filter elements 19 and 20 are also fed to another pair of amplifier-and-filter elements 25 and 26 respectively, in addition to being fed into multiplier 21. The filter of each of the elements 25 and 26 again may be a derivative circuit, and in the preferred example (FIG. 3) is the same as the derivative circuit of elements 19 and 20. Thus the outputs of elements 25 and 26 are the second derivative with respect to time of the original seismometer signals. The second derivative signals are fed from elements 25 and 26 in turn, into another multiplier element 28 and also into another pair of amplifier-and-filter elements 31 and 32 respectively. The output of the multiplier 28 is fed to another proportioning device 34 and from there to another input of the adder 16.

At the same time, an additional component of the signals is obtained at the outputs from amplifier-and-filter elements 31 and 32 which are fed to another multiplier elements 36. In addition the outputs of elements 31 and 32 go to the inputs of still another pair of amplifier-and-filter elements 39 and 40 respectively. The output of multiplier 36 is fed to another proportioning device 42, from which the signals go to another input of the adder 16.

Finally the outputs of amplifier-and-filter elements 39 and 40 are fed to still another multiplier 44 from which the product of these signals goes to another proportioning device 46 and then to the final input of adder 16.

After passing through the adjustable proportioning devices 15, 22, 34, 42 and 46, the signals are all added together in the adder 16; and an output from the adder is fed to a utilization device, such as a recorder 48 that is indicated in FIG. 1. Of course the utilization device may take various forms, e.g. it may be an oscillograph for recording the summation signal resulting from the addition of the products involved in the system. Furthermore, it will be clear to anyone skilled in the art that the utilization device may have a plurality of traces or channels like the one illustrated.

It is pointed out that a differentiator is a particular type of filter. Consequently, the term filter as used in this application is intended to encompass differentiation circuits or arrangements.

Referring to FIG. 2 it is pointed out that whereas in FIG. 1 the components of the signals that were treated were progressively derived from one another in series (for the taking of first, second and higher derivatives of the signals), in the FIG. 2 system the arrangement is such that components of the signals are taken directly for multiplication in each case. Thus, there is shown in FIG. 2 a pair of input terminals 51 for receiving a pair of input signals that are suspected of containing correlative information therein. These terminals 51 are connected to feed the signals directly to a multiplier 52. The output of multiplier 52 is fed to a potentiometer 53, which acts as a proportioning device and which has the slider thereof connected for feeding the output signal to the input of an adder 54. In this instance adder 54 comprises a triode electron tube 57 that feeds its output to a transformer 58, which in turn feeds the output signals therefrom to a pair of output terminals 59.

The additional channels of the FIG. 2 system include similar arrangements which provide a pair of filters 62 and 63 for receiving the signals from input terminals 51. Filters 62 and 63 are each of substantially identical characteristics so that the same component is filtered out of each of the two input signals at terminals 51. These filtered signals are fed into another multiplier 65, from which the output or product signal thereof goes to another potentiometer 66 which feeds its output into the input of the adder tube 57, to be added with the other input signals thereto.

Another channel for the signals from input terminals 51 is that including filters 69 and 70. Filters 69 and 70 are filters of the same type as filters 62 and 63 but have different circuit constants for deriving a different component from the signals. The filters 69 and 70 feed their signals into another multiplier 71 which produces a product signal that is fed to a potentiometer 72 that feeds its output signal into the adder tube 57, along with the other inputs thereto.

Finally there may be a channel for taking still another component of the input signals by feeding them to another pair of filters 75 and 76 that feed their outputs into a multiplier 77. The output of multiplier 77 is fed to a potentiometer 78 which is connected to the input of the adder tube 57.

It is pointed out that the filters of the FIG. 2 system may be different types of filters; but in each channel the two filters making a pair, i.e. 62, 63 or 69, 70, or 75, 76, are each the same as one another so that the same component is derived from each of the two input signals. The number of channels employed depends upon the application and the particular design factors involved in any given instance, there being three filter channels illustrated in FIG. 2 merely by way of illustrating the coverage of a range of frequencies for reflection seismic purposes.

FIG. 4 illustrates a conventional circuit for a band pass filter, and this may be employed as each of the filters shown in FIG. 2. Of course the circuit constants employed in the filters for each pair thereof, will be different so as to obtain the desired component of the input signals in each case.

FIG. 5 illustrates the characteristics for the filters that may be employed in FIG. 2. It is pointed out that the circuit constants of the band pass filter circuit in each case will be adjusted for obtaining one of the three different band passes of frequency as shown in FIG. 5. That is, the filters 62 and 63 will be adjusted for providing a band pass filter having the characteristics indicated by a curve 81 shown in FIG. 5, while the filters 69 and 70 will be adjusted to produce a band pass characteristic in accordance with a curve 82 shown in FIG. 5. Finally, the characteristics for filters 75 and 76 will be such that their characteristic curve of band pass frequencies will be like a curve 83 illustrated in FIG. 5.

It will be clear to anyone skilled in the art that by adjusting the potentiometers 53, 66, 72 and 78, the proportions of the various components in relation to one another and to the product of the two signals themselves, may be adjusted in any desired manner for producing optimum output results.

Multipliers 52, 65, 71, and 77, like multipliers 14, 21, 28, 36 and 44, may take different forms so long as an effective multiplication is accomplished between the two input signals of each. Furthermore the details of the multiplier circuit employed, forms no part per se of this invention. However a preferred form, for seismic application of this invention, is shown in greater detail in the FIG. 3 illustration. This will be more fully described below.

FIG. 3 illustrates a more detailed circuit arrangement which may be employed in accordance with the FIG. 1 system. Thus the output signals from seismometers 11 and 12 will be carried via a pair of input terminals 86 and 87 (FIG. 1) that are shown in FIG. 3 also. These signals are fed directly into a multiplier 90 that is shown enclosed in dashed lines in FIG. 3.

It is pointed out that the details of the multiplier 90 are substantially the same as the multiplier elements that are disclosed in my copending application referred to above (Serial No. 393,433, filed November 20, 1953), and consequently need not be reviewed in detail here. It is deemed sufficient to point out that input signals from terminal 86 are introduced to a pair of multiplier tubes 93 and 94, via a phase splitting transformer 95. Similarly, the signals from input terminal 87 are also introduced to the multiplier tubes 93 and 94, but via another phase-splitting transformer 96.

As described in my copending application, the multiplier tubes 93 and 94 are any of a variety of suitable kinds such as "gated-beam" tubes 6BN6's which are characterized by the fact that they will amplify a signal which is fed to an input electrode to an extent which is determined by the potential of another electrode, which may also serve as an input electrode. Because of this, if two varying signals are simultaneously applied to two respective electrodes of such a tube, the instantaneous voltages of each will be amplified in accordance with corresponding instantaneous voltages of the other; thereby producing an output which is proportional to their product.

It is to be noted that in use with seismic signals, it is desirable to provide for the suppression of an output product signal when the sign of such output is negative. Consequently this result may be obtained by the biasing of the multiplier tubes 93 and 94 for class B operations. However, to avoid frequency doubling in the output of the multiplier tubes 93 and 94, they are connected to push-pull arrangement. This push-pull output is fed to a common output circuit connection 99 via a pair of impedance changer triode tubes 100 and 101.

The connection 99 leads to a potentiometer 104 that acts as a proportioning device. This is a specific illustration of the structure of the proportioning device 15 that is indicated by a block in the schematic diagram of FIG. 1. The output of potentiometer 104 leads to the input of a triode tube 105 that with its associated circuits acts as the adder 16 of FIG. 1. Thus, tube 105 passes on the summation of its input signals, via a transformer 106 which is connected by means of its secondary winding to a pair of output terminals 107.

It will be observed that by means of circuit connections 110 and 111 at the system input (FIG. 3); the signals received at terminals 86 and 87 respectively are carried to a differentiator-and-amplifier 112 and 113, again respectively, in each case. The detailed circuit elements of these differentiator-amplifiers are substantially identical and consequently only those elements of one of the units, i.e. differentiator-amplifier 112, are shown in detail.

These detailed elements (of differentiator 112) include a capacitor 116 that acts as a differentiator of the signals existing at terminal 86 and feeds the differentiated signals to the inputs of a triode tube 117. Tube 117 in turn is coupled to another triode 118, that feeds its output via the illustrated circuit to one of the inputs for a multiplier 120. The other input for the multiplier 120 is the output signals from the other differentiator-and-amplifier circuit 113.

The elements of the multiplier 120 are identical with the element shown in detail for the multiplier 90 and consequently have not been illustrated. The output signals from multiplier 120 are carried to another potentiometer 121 that has its output connected in parallel with the output of potentiometer 104, as another of the inputs for the adder tube 105. Thus the first derivatives with respect to time, of the signals are multiplied together in multiplier 120; and then after proportioning by means of the potentiometer 121, are added with the product signals from the multiplier 90.

In order to obtain the product of the second derivative of the original signals, the circuit arrangements are as indicated, such that the output of first derivative elements 112 and 113 are directed to the input of identical differentiator-and-amplifier elements 124 and 125. Then, these second derivative signals are multiplied together by being introduced to another multiplier 128 for obtaining the product thereof. This product is carried to another potentiometer 129 for proportioning and adding of this product with the other product signals.

The differentiation is carried out for one further step by means of differentiator-and-amplifier elements 130 and 131 that are connected to the output of the differentiators 124 and 125 respectively. The third derivative output signals from differentiators 130 and 131 are introduced as the inputs to another multiplier 132, that has the output thereof connected to a fourth potentiometer 133.

It will be clear to anyone skilled in the art, that the differentiation steps may be carried out to any desired degree, so that the fourth, fifth, etc. to the $n$th derivative of the original signals may be obtained and the product of each, determined in the same manner as for the three differentials illustrated in the FIG. 3 system. This is indicated in the FIG. 3 showing where dashed line connections are made in connecting differentiators 130 and 131 as well as multiplier 132, into the circuit of the whole system. Also, it will be noted that the FIG. 1 block diagram shows through the fourth derivatives, being taken.

It will be understood (as already indicated) that there are many other and different multipliers which might be employed as the multiplication elements in either of the two systems illustrated in this application, and the specific multiplication circuit illustrated is merely a preferred multiplier that is best for use with seismic signals, for the reasons indicated that are concerned with the discarding of negative products.

By way of emphasis, it may be pointed out again that a particular benefit contemplated for this invention is that with seismic signals, where reflected energy is being sought after in a seismic sounding or recording, and particularly in the situation with the use of a multiplier arrangement for emphasizing correlative (i.e. reflection) data. In such a seismic application there may be the situation involving one of the pair of signals that are to be multiplied having a reflection present therein, that would be clearly recognizable if the correlation signal from the other one of the pair of signals were free from certain interfering data. Thus, although the other of the pair of signals also contains such reflection, it is masked by reason of a negative swing of signal (usually having a much lower frequency). Under these conditions, the mere use of multiplication of the pair of signals together is fruitless since the negative sign results are discarded. With the use of this invention however, the reflection will not be lost on at least some of the derivative channels of the entire system, even though it will be lost over the direct channel where the signals proper are multiplied together. Thus some of the derivative signals will have the masked reflection existing in a positive signal, and consequently the product of the derivative signals will provide an output that is the desired reflection. By properly proportioning the outputs of the different channels of the system, the summation output signal may be provided with an optimum amplitude for most conditions of the input signals.

While certain embodiments of the invention have been described above in considerable detail in accordance with the applicable statutes, this is not to be taken as in any way limiting the invention but merely as being descriptive thereof.

What is claimed as the invention is:

1. In data processing, a system for emphasizing correlative information in a pair of signals comprising means for multiplying said signals together to provide a first output, means for filtering each of said signals to derive components therefrom, means for multiplying said filtered components together to provide a second output, means for proportioning said first and second outputs, and means for adding said proportioned outputs to provide a final output signal with non-correlative data in said pair suppressed in favor of correlative data.

2. In data processing, a system for emphasizing correlative information in a pair of signals comprising means for multiplying said signals together to provide a first output, means for taking a derivative with respect to time of each of said signals, means for multiplying said derivatives together to provide a second output, means for proportioning said first and second outputs, and means for adding said proportioned outputs to provide a final output signal with non-correlative data in said pair of signals suppressed in favor of correlative data.

3. In data processing, a system for emphasizing correlative information in a pair of signals comprising means for multiplying said signals together to provide a first output, means for taking the first derivative with respect to time of each of said signals, means for multiplying said derivatives together to provide a second output, means for taking the second derivative with respect to time of each of said signals, means for multiplying said second derivatives together to provide a third output, means for proportioning all of said outputs relative to one another, and means for adding said proportioned outputs to provide a final output signal with non-correlative data in said pair of signals suppressed in favor of correlative data.

4. In data processing, a system for emphasizing correlative information in a pair of signals comprising means for multiplying said signals together to provide a first output, means for filtering each of said signals to pass a predetermined band of frequency components, means for multiplying said filtered components together to provide a second output, means for proportioning said first and second outputs, and means for adding said proportioned outputs to provide a final output signal with non-correlative data in said pair of signals suppressed in favor of correlative data.

5. In a seismic signal data processing, a system of reducing the amplitude of non-correlative data from a pair of seismometers, said seismometers being so located relative to one another that the signals generated thereby should be correlatable if reflected energy is being received by the seismometers comprising means for multiplying said seismometer signals together to provide a first output signal, means for filtering each of said seismometer signals to derive components therefrom, means for multiplying said filtered components together to provide a second output signal, means for proportioning said first and second output signals, and means for adding said proportioned output signals together to provide a final output signal with non-correlative data in said seismometer signal suppressed in favor of correlative data therein.

6. The invention according to claim 5, wherein said means for filtering comprises means for taking a first derivative with respect to time of said seismometer signals.

7. In seismic signal data processing, a system for reducing the amplitude of non-correlative data from a pair of seismometers, said seismometers being so located relative to one another that the signals generated thereby should be correlatable if reflected energy is being received by the seismometers comprising means for multiplying said seismometer signals together to provide a first output signal, means for filtering each of said seismometer signals to pass a predetermined band of frequency components, means for multiplying said filtered components together to provide a second output signal, means for proportioning said first and second output signals, and means for adding said proportioned output signals together to provide a final output signal with non-correlative data in said seismometer signals suppressed in favor of correlative data therein.

8. In seismic signal data processing, a system of reducing the amplitude of non-correlative data from a pair of seismometers, said seismometers being so located relative to one another that the signals generated thereby should be correlatable if reflected energy is being received by the seismometers comprising means for multiplying said seismometer signals together to provide a first output signal, means for filtering comprising taking a first derivative with respect to time of each of said seismometer signals to derive components therefrom, means for multiplying said filtered components together to provide a second output signal, means for taking a second derivative with respect to time of each of said seismometer signals, means for multiplying said second derivatives together to provide a third output signal, means for proportioning said first, second and third output signals, and means for adding said proportioned output signals together to provide a final output signal with non-correlative data in said seismometer signals suppressed in favor of correlative data therein.

9. In seismic signal data processing, a system for reducing the amplitude of non-correlative data from a pair of seismometers, said seismometers being so located relative to one another that the signals generated thereby should be correlatable if reflected energy is being received by the seismometers comprising means for multiplying said seismometer signals together to provide a first output signal, means for filtering each of said seismometer signals to pass a predetermined band of frequency components, means for multiplying said filtered components together to provide a second output signal, means for filtering each of said seismometer signals to pass another predetermined different band of frequency components, means for multiplying said different filtered components together to provide a third output signal, means for proportioning said first, second and third output signals, and means for adding said proportioned output signals together to provide a final output signal with non-correlative data in said seismometer signals suppressed in favor of correlative data therein.

References Cited in the file of this patent

UNITED STATES PATENTS

| | | |
|---|---|---|
| 2,889,000 | Silverman | June 2, 1959 |
| 2,897,477 | Lindsey | July 28, 1959 |